(12) United States Patent
Lee et al.

(10) Patent No.: US 9,151,435 B2
(45) Date of Patent: Oct. 6, 2015

(54) VACUUM INSULATION MATERIAL INCLUDING AN INNER BAG, AND METHOD FOR MANUFACTURING SAME

(75) Inventors: Myung Lee, Hwaseong-si (KR); Seong-Moon Jung, Daejeon (KR); Suk Jang, Seoul (KR); Eun-Joo Kim, Anyang-si (KR)

(73) Assignee: LG HAUSYS, LTD., Seoul (KR)

( * ) Notice: Subject to any disclaimer, the term of this patent is extended or adjusted under 35 U.S.C. 154(b) by 142 days.

(21) Appl. No.: 13/979,993

(22) PCT Filed: Feb. 20, 2012

(86) PCT No.: PCT/KR2012/001234
§ 371 (c)(1),
(2), (4) Date: Jul. 16, 2013

(87) PCT Pub. No.: WO2012/115400
PCT Pub. Date: Aug. 30, 2012

(65) Prior Publication Data
US 2013/0287978 A1    Oct. 31, 2013

(30) Foreign Application Priority Data

Feb. 21, 2011   (KR) .................. 10-2011-0015171
Feb. 16, 2012   (KR) .................. 10-2012-0015867

(51) Int. Cl.
*B32B 3/24*       (2006.01)
*F16L 59/02*      (2006.01)
(Continued)

(52) U.S. Cl.
CPC .................. *F16L 59/026* (2013.01); *B32B 3/04* (2013.01); *B32B 5/022* (2013.01); *B32B 7/12* (2013.01);
(Continued)

(58) Field of Classification Search
CPC ...... Y10T 428/231; E04B 1/803; Y02B 80/12
USPC ................................................ 428/69
See application file for complete search history.

(56) References Cited

U.S. PATENT DOCUMENTS 5,018,328 A      5/1991   Cur et al.
5,376,424 A  *  12/1994   Watanabe ................... 428/69
(Continued)

FOREIGN PATENT DOCUMENTS

CN         1760581 A      4/2006
JP         08082474 A     3/1996
(Continued)

OTHER PUBLICATIONS

Machine translation of JP 2004-058364, Mar. 11, 2015.*
(Continued)

*Primary Examiner* — Alexander Thomas
(74) *Attorney, Agent, or Firm* — Lowe Hauptman & Ham, LLP

(57) ABSTRACT

The present invention relates to a vacuum insulation material including an inner bag and to a method for manufacturing same. The method for manufacturing the vacuum insulation material includes: a step of manufacturing a core material; a step of compressing and packing the entire surface of the core material using an inner bag made of a breathable film material; a step of disposing a getter on the upper portion of the inner bag; and a step of vacuum-packing a covering material on the upper portion of the inner bag. The inner bag is made of polypropylene (PP), polyester (PET), and/or polyethylene. Since the inner bag is manufactured using a breathable film having fine holes, the method for manufacturing the vacuum insulation material may have improved efficiency, and the vacuum insulation material may be improved in terms of the long-term durability and vacuum insulation properties thereof.

6 Claims, 1 Drawing Sheet

(51) Int. Cl.

| | | |
|---|---|---|
| *B32B 15/08* | (2006.01) | |
| *B32B 15/20* | (2006.01) | |
| *F16L 59/065* | (2006.01) | |
| *E04B 1/80* | (2006.01) | |
| *B32B 5/02* | (2006.01) | |
| *B32B 7/12* | (2006.01) | |
| *B32B 27/12* | (2006.01) | |
| *B32B 27/30* | (2006.01) | |
| *B32B 27/32* | (2006.01) | |
| *B32B 3/04* | (2006.01) | |

(52) U.S. Cl.
CPC ............... *B32B 15/08* (2013.01); *B32B 15/20* (2013.01); *B32B 27/12* (2013.01); *B32B 27/302* (2013.01); *B32B 27/304* (2013.01); *B32B 27/32* (2013.01); *E04B 1/803* (2013.01); *F16L 59/065* (2013.01); *B32B 2255/10* (2013.01); *B32B 2255/26* (2013.01); *B32B 2262/101* (2013.01); *B32B 2307/302* (2013.01); *B32B 2307/3065* (2013.01); *B32B 2307/7242* (2013.01); *B32B 2509/10* (2013.01); *Y02B 80/12* (2013.01); *Y10T 428/1334* (2015.01); *Y10T 428/1338* (2015.01)

(56) References Cited

U.S. PATENT DOCUMENTS

| | | | | |
|---|---|---|---|---|
| 5,399,397 | A | * | 3/1995 | Kollie et al. ............... 428/35.4 |
| 5,505,810 | A | * | 4/1996 | Kirby et al. ............... 156/286 |
| 2002/0022422 | A1 | | 2/2002 | Waldrop, III et al. |
| 2006/0088685 | A1 | | 4/2006 | Echigoya et al. |
| 2006/0261718 | A1 | | 11/2006 | Miseki et al. |

FOREIGN PATENT DOCUMENTS

| | | |
|---|---|---|
| JP | 2572154 B2 | 1/1997 |
| JP | 09318238 A | 12/1997 |
| JP | 11336991 A | 12/1999 |
| JP | 2000291881 A | 10/2000 |
| JP | 2004058364 | 2/2004 |
| JP | 2006077910 A | 3/2006 |
| JP | 2006336722 A | 12/2006 |
| JP | 2010071303 | 4/2010 |
| JP | 2010173700 A | 8/2010 |
| JP | 2010276171 A | 12/2010 |
| KR | 1020060053137 | 5/2006 |
| KR | 20060119730 A | 11/2006 |
| KR | 100750302 | 8/2007 |
| KR | 20110101786 A | 9/2011 |
| WO | 2007061196 A2 | 5/2007 |

OTHER PUBLICATIONS

Extended European Search Report dated Jun. 13, 2014.
Chinese Office Action dated Jul. 21, 2014.
International Search Report mailed Aug. 24, 2012 for PCT/KR2012/001234.
Japanese Office Action dated Jul. 1, 2014.
Korean Office Action dated Feb. 26, 2014.

* cited by examiner

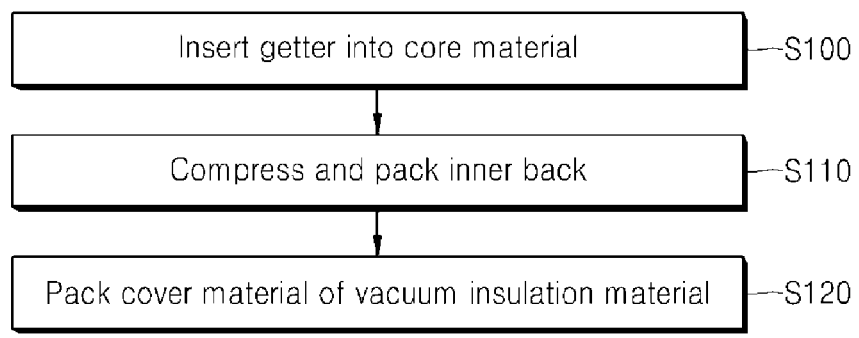
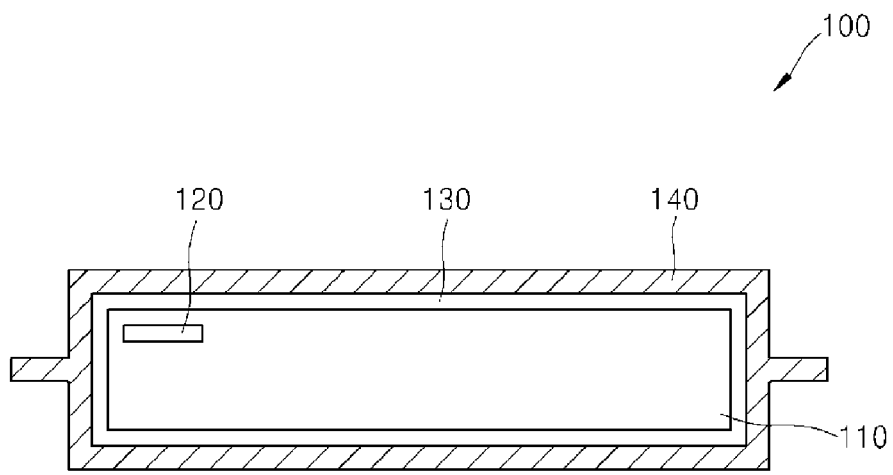
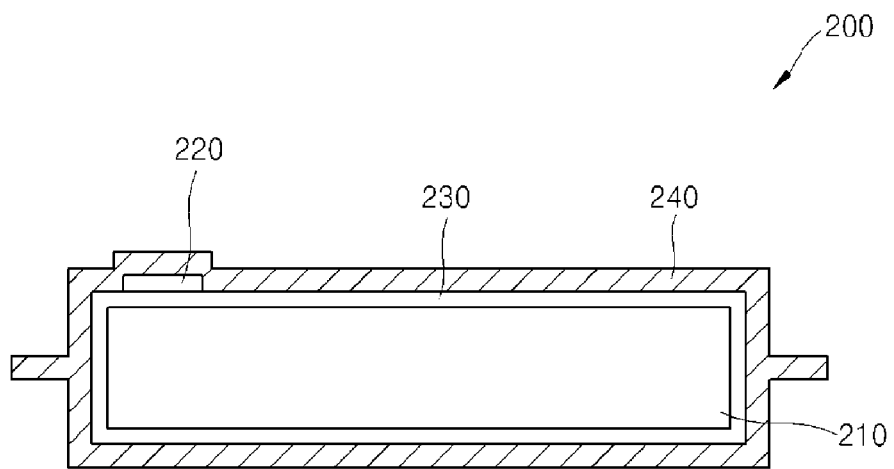

VACUUM INSULATION MATERIAL INCLUDING AN INNER BAG, AND METHOD FOR MANUFACTURING SAME

CROSS REFERENCE TO RELATED APPLICATION

This application claims the priority of Korean Patent Application No. 10-2011-0015171, filed on Feb. 21, 2011 and No. 10-2012-0015867, filed on Feb. 16, 2012 in the KIPO (Korean Intellectual Property Office). Further, this application is the National Phase application of International Application No. PCT/KR2012/001234 filed on Feb. 20, 2012, which designates the United States and was published in Korean.

TECHNICAL FIELD

The present invention relates to a vacuum insulation material including an inner bag and a method for manufacturing the same, and more particularly, to a technology of manufacturing a vacuum insulation material, in which the surface of a core material is primarily compressed and packed by an inner back formed of an air-permeable film so as to facilitate a process of compressing and drying the core material.

BACKGROUND ART

A vacuum insulation panel (hereinafter, vacuum insulation material) is manufactured by decompressing an encapsulant, which is comprised of a composite plastic laminate film exhibiting excellent gas barrier capabilities and receives an open cell hard plastic foam or an inorganic material as a core material therein, followed by heat sealing laminated gas barrier films along an edge thereof.

Generally, as air or moisture passes through a cover material or carbon dioxides or organic gas is generated therein, the vacuum insulation material undergoes gradual reduction in the degree of vacuum over time, thereby causing increase in thermal conductivity and thus making it difficult to maintain a high degree of insulation.

To solve such a basic problem, a vacuum insulation material in the art includes a core material, which is prepared by mixing a glass board generally prepared through a wet process, an organic binder and glass fibers.

Among these materials, glass wool provided to the vacuum insulation material provides excellent initial thermal capabilities, and thus is widely applied to electronic appliances, such as refrigerators, for reduction in power consumption.

However, when producing an 8 mm thick vacuum insulation material using such a glass wool material, it is necessary for the glass wool material to have a thickness of at least 80 mm or more.

As such, since it is difficult to insert such a thick glass wool material into a cover material in fabrication of the vacuum insulation material and handling of the glass wool material is also difficult, the glass wool material is thinly compressed before insertion into the cover material.

In a first compression method, glass wool is heated to a glass transition temperature and then compressed. In this case, since it is necessary to heat the glass wool to a temperature of 500° C. or more, this method requires a separate drying oven to maintain high temperature and excessively high equipment costs.

In a second compression method, a binder is used to promote coupling between fibers upon compression. In this case, although compression can be carried out efficiently, the vacuum insulation material can suffer from deterioration in thermal capabilities due to the binder.

As such, both methods in the art have problems in that the first method causes deformation of the glass wool and the second method does not permit reuse of the glass wool due to the use of the binder.

Moreover, in these methods, when the glass wool, that is, the core material, is inserted into the cover material, the fibers of the glass wool are brought into contact with film layers inside the cover material and thus cause damage to the cover material, thereby having undesirable effects on performance of the vacuum insulation material.

DISCLOSURE

Technical Problem

An aspect of the present invention is to provide a method for manufacturing a vacuum insulation material, in which a core material is formed through drying and molding of binder-free pure glass wool using a vacuum chamber to permit easy mass production while providing excellent insulation characteristics, a cover material coated with a vinyl-based resin is used to improve gas barrier and blocking capabilities, and a getter of lime powder is used to maximize moisture absorption.

Technical Solution

In accordance with an aspect of the present invention, a vacuum insulation material includes an inner bag made of an air-permeable film and primarily compressing and packing a surface of a core material, a cover material disposed on the inner bag through vacuum packing, and a getter inserted between the core material and the inner bag or between the inner bag and the cover material.

The inner bag may be an air-permeable film formed of at least one selected from among polypropylene (PP), polyester (PET) and polyethylene (PE) and having fine holes.

In accordance with another aspect of the present invention, a method for manufacturing a vacuum insulation material includes: preparing a core material; compressing and packing an overall surface of the core material with an inner bag made of an air-permeable film; placing a getter on the inner bag; and vacuum-packing the inner bag with a cover material.

In accordance with a further aspect of the present invention, a method for manufacturing a vacuum insulation material includes: preparing a core material; inserting a getter into the core material; compressing and packing an overall surface of the core material including the getter with an inner bag made of an air-permeable film; and vacuum-packing the inner bag with a cover material.

Advantageous Effects

As such, in a process of preparing a core material for a vacuum insulation material according to the present invention, the core material is prepared using glass wool exhibiting excellent initial thermal conductivity and an air permeable inner bag instead of using an inorganic binder solution, thereby achieving process simplification.

In addition, the method according to the present invention can prevent deformation of glass wool due to the use of a binder, thereby enabling reuse of the glass wool.

Further, the method according to the present invention does not need heating to glass transition temperatures upon processing the vacuum insulation material, thereby eliminating equipment for drying at high temperatures. Thus, the present invention enables reduction of manufacturing facilities and costs.

DESCRIPTION OF DRAWINGS

FIG. 1 is a flowchart of a method for manufacturing a vacuum insulation material including an inner bag.

FIG. 2 is a sectional view of a vacuum insulation material including an inner bag in accordance with one embodiment of the present invention.

FIG. 3 is a sectional view of a vacuum insulation material including an inner bag in accordance with another embodiment of the present invention.

BEST MODE

The present invention is directed to optimization of a cover material and a getter as well as a core material for manufacture of a vacuum insulation material having excellent long-term durability.

Hereinafter, a vacuum insulation material including an inner bag and a method for manufacturing the same according to the present invention will be described in more detail.

The above and other aspects, features, and advantages of the present invention will become apparent from the detailed description of the following embodiments in conjunction with the accompanying drawings. It should be understood that the present invention is not limited to the following embodiments and may be embodied in different ways, and that the embodiments are provided for complete disclosure and a thorough understanding of the present invention by those skilled in the art. The scope of the present invention is defined only by the claims. Like components will be denoted by like reference numerals throughout the specification.

A process of preparing a core material for a vacuum insulation material according to the present invention includes primarily compressing and packing a glass wool with an inner bag made of an air-permeable film, and drying the packed glass wool.

Then, a cover material having a laminate structure of a surface protective layer, a metal barrier layer and an adhesive layer is prepared.

Then, a getter is prepared by packing quicklime (CaO) powder in a pouch.

Next, with the getter attached to an upper portion of the inner bag, or with the getter inserted between the core material and the inner bag, an encapsulant is formed using the cover material, and the core material including the inner bag is placed in the encapsulant, which in turn is subjected to vacuum sealing, thereby completing a vacuum insulation material.

Here, the upper portion refers to an exterior surface of a corresponding material. Thus, as used herein, the lower portion may refer to the interior of the inner bag or the interior of the cover material instead of actually indicating a portion beneath a certain material. In other words, as used herein, the upper portion and the lower portion can be used as the same meanings as those of the exterior and the interior, respectively, without being limited thereby.

Now, a method for manufacturing a core material according to the present invention and a detailed configuration of the core material will be described.

FIG. 1 is a flowchart of a method for manufacturing a vacuum insulation material including an inner bag.

Referring to FIG. 1, a glass wool member substantially having a desired shape of a core material to be formed is prepared (S100). One example of glass wool includes glass cotton. For example, a glass cotton fabric member having a thickness of 80 mm to 100 mm, or two or more sheets of the glass cotton fabric members may be used, as needed.

In addition, the glass cotton fabric member may have a rectangular shape, a circular shape, or the like corresponding to the shape of the vacuum insulation material.

Next, with air-permeable films placed on upper and lower surfaces of the glass wool member, the glass wool member is compressed from the upper and lower surfaces thereof using a plate, and sealed along all edges of the glass wool member to provide an inner bag made of the air-permeable film and surrounding the glass wool core material (S110).

At this time, the inner bag may be prepared using an air permeable film, which is made of at least one selected from polypropylene (PP), polyester (PET) and polyethylene (PE), and is formed with fine holes to ensure air-permeability.

If the inner bag is prepared from a non-air permeable film, gas or moisture cannot be extracted from the glass wool member upon vacuum evacuation for manufacture of the vacuum insulation material. Thus, it is necessary to perform an additional process of opening (tearing) the non-air permeable film before inserting and vacuum evacuating the core material including the non-air permeable film into the cover material.

Further, since the inner bag is formed of the non-air permeable film, a thick glass wool member is packed with the non-air permeable film after drying. Here, since the size of the glass wool member before packing is three times larger than that of the glass wool member after packing, a drying furnace has a relatively large size, causing increase in facility costs.

In addition, since the glass wool member does not exhibit stiffness before being conveyed into the drying furnace and after being dried in the drying furnace, separate conveying devices are required.

Thus, in this invention, the inner bag is made of the air-permeable film, and drying is performed after primary compression and packing such that the glass wool member has a thickness of about 20 to 40 mm.

The fine holes of the air-permeable film may have a diameter in the range of 0.001 to 10 μm, preferably in the range of 0.1 to 10 μm. If the fine holes of the air-permeable film have a diameter of less than 0.1 μm, gas or moisture can be insufficiently escaped through the fine holes in manufacture of the vacuum insulation material, thereby causing defects of the vacuum insulation material. If the fine holes of the air permeable film has a diameter of greater than 10 μm, not only gas or moisture but also fibers constituting the core material can escape through the fine holes. Thus, the fine holes of the air-permeable film have a diameter of 0.1 to 10 μm in order to ensure efficient manufacture of the vacuum insulation material.

Further, the fine holes of the air-permeable film may occupy 30~90% of an overall surface area of the air-permeable film. If the surface area of the fine holes occupies less than 30% of the overall surface area of the air-permeable film, gas or moisture can be insufficiently escaped through the fine holes in manufacture of the vacuum insulation material. If the surface area of the fine holes exceeds 90% of the overall surface area of the air-permeable film, the air-permeable film can be torn in the process of packing the core material. Thus, the surface area of the fine holes of the air-permeable film occupies 30~90% of the overall surface area of the air-permeable film in order to ensure efficient manufacture of the vacuum insulation material.

Drying of the glass wool member may be performed at 110° C. to 130° C. for 1 to 2 hours.

If drying of the glass wool member is performed at a temperature less than 110° C. or for less than 1 hour, it is difficult to achieve complete curing of the glass wool member.

If drying of the glass wool member is performed at a temperature exceeding 130° C. or for more than 2 hours, drying becomes unnecessary after the glass wool member is completely dried, causing energy consumption.

Since such a drying process is carried out at lower temperature than an existing heat compression process, the drying process can reduce energy consumption and power for compression, thereby allowing the process of manufacturing the core material to be performed more efficiently.

After preparing the core material enclosed by the inner bag as described above, the core material is vacuum-packed with a cover material (S120).

Here, the cover material is a vacuum encapsulant, and a method of manufacturing the cover material will now be described together with a detailed shape of the cover material.

The cover material includes an adhesive layer, a metal barrier layer and a surface protective layer stacked in this order from a bottom thereof. Here, the adhesive layer can be defined as a layer formed within the encapsulant and the surface protective layer can be defined as an outermost layer exposed to the outside.

Further, the adhesive layer is bonded by heat sealing and serves to maintain the cover material in a vacuum. Thus, the adhesive layer may be formed of at least one thermoplastic film selected from high density polyethylene (HDPE), low density polyethylene (LDPE), linear low density polyethylene (LLDPE), cast polypropylene (CPP), oriented polypropylene (OPP), polyvinylidene chloride (PVDC), polyvinyl chloride (PVC), ethylene-acetate vinyl copolymer (EVA), and ethylene-vinyl alcohol copolymer (EVOH) films, which permit easy heat bonding. The adhesive layer may be formed to a thickness of 1 to 100 μm to provide sufficient sealing characteristics.

Next, a 6~12 μm thick metal layer is formed as a barrier for gas blocking and protection of the core material on the adhesive layer.

Since an Al foil metal barrier layer is generally used and a film having superior properties to the Al foil has not been yet developed in the art, an Al foil is also used in the present invention. Here, since Al is a metallic material, there can be a problem of cracking upon bending or the like. Thus, to prevent such a problem, the surface protective layer is formed on the metal barrier layer.

The surface protective layer of the cover material according to the present invention may be formed by stacking a 10~20 μm thick polyethylene terephthalate (PET) film and a 10~30 μm thick Nylon film.

Here, when the barrier layer and the surface protective layer have thicknesses deviating from these ranges, the cover material can suffer from cracking or deterioration in vacuum insulation.

In this case, if the metal barrier layer undergoes severe cracking, the laminate structure of the polyethylene terephthalate/Nylon films can be damaged. Thus, in the present invention, a vinyl-based resin layer is formed on the polyethylene terephthalate layer to prevent such a problem.

Next, the surface protective layer of the cover material according to the present invention may have a laminate structure of a polyethylene terephthalate layer and a vinyl-based resin layer, in which the polyethylene terephthalate layer becomes an outermost layer. Here, the vinyl-based resin layer may be formed of at least one vinyl resin selected from polyvinyl chloride (PVC), polyvinyl acetate (PVA), polyvinyl alcohol (PVAL), polyvinyl butyral (PVB), and polyvinylidene chloride (PVDC) resins.

Furthermore, to achieve further improvement of sealing characteristics of the cover material, each of the surface protective layer, the metal barrier layer and the adhesive layer may be bonded by a polyurethane (PU) resin.

With the cover material formed in this way, the vacuum insulation pad according to the present invention may have optimal sealing properties and long-term durability.

Further, a flame retardant coating layer may be formed in the form of a film on the surface protective layer of the cover material. With such a flame retardant coating layer, the vacuum insulation material provides excellent flame retardancy. Although any flame retardant capable of imparting flame retardancy can be used without limitation, the flame retardant coating layer may be formed of at least one material selected from non-halogen type phosphorous compounds, nitrogen compounds, aluminum hydroxide and antimony trioxide.

As used herein, the nitrogen compounds generally refer to melamine, urea, amine and amide-based flame retardants, and the phosphorous compounds generally refer to phosphorous-based flame retardants, such as red phosphor, phosphate ester, and the like. Preferably, a mixture of the nitrogen compound and the phosphorous compound is used to achieve synergetic flame retardancy.

Further, since aluminum hydroxide has advantages in terms of economic feasibility due to its low corrosiveness and excellent electric insulation, the aluminum hydroxide is advantageously used as the flame retardant in formation of the flame retardant coating layer. When used together with other flame retardants, the antimony trioxide provides significantly improved flame retardancy.

The flame retardant coating layer may be formed by coating a coating composition consisting of 10~90% by weight of the retardant and 10~90% by weight of a polymer resin and an organic solvent on a surface of the surface protective layer. In addition, preferably, the flame retardant coating layer is formed by coating a coating composition consisting of 5~50% by weight of the phosphorous compound, 5~50% by weight of the nitrogen compound and 40~90% by weight of the polymer resin and the organic solvent on the surface of the surface protective layer. If the phosphorous compound is added in an amount of less than 5% by weight or the nitrogen compound is added in an amount of less than 5% by weight, it is difficult to secure sufficient flame retardancy. Further, if the added amount of the phosphorous compound exceeds 50% by weight or the added amount of the nitrogen compound exceeds 50% by weight, the content of other materials except for the flame retardant composition is reduced, thereby making it difficult to form the flame retardant coating layer. The polymer resin and the organic solvent may be added in a total amount of 40~90% by weight. If the polymer resin and the organic solvent are added in an amount of less than 40% by weight, there can be difficulty in formation of the flame retardant coating layer, and if the polymer resin and the organic solvent are added in an amount of greater than 90% by weight, it is difficult to secure flame retardancy. The polymer resin may be polyester or polyurethane, and the organic solvent may be any solvent capable of being used in a typical coating composition.

Further, to prevent gas and moisture from being generated in the cover material due to variation in external temperature, the vacuum insulation material according to the present invention is provided with the getter, which may be inserted into the core material, or may be placed between the inner bag and the cover material.

Next, exemplary embodiments of the vacuum insulation material according to insertion locations of the getter will be described.

FIG. 2 is a sectional view of a vacuum insulation material including an inner bag according to one embodiment of the present invention.

In FIG. 2, a vacuum insulation material 100 according to this embodiment includes a core material 110 and a getter 120 placed inside the core material 110.

The core material 110 is surrounded by an inner bag made of an air-permeable film 130, and the inner bag 130 is surrounded by a cover material 140.

Here, the getter is prepared by packing quicklime (CaO) in a pouch. In the present invention, quicklime powder having a purity of 95% or more is used, and the pouch may be made of crepe paper and polypropylene (PP)-impregnated non-woven fabrics so as to secure a moisture absorption capability of 25% or more.

In addition, the getter may have a thickness of 2 mm or less in consideration of the thickness of the overall insulation material.

FIG. 3 is a sectional view of a vacuum insulation material including an inner bag according to another embodiment of the present invention.

Referring to FIG. 3, a getter 220 is inserted between an inner bag 230 and a cover material 240.

Here, in a process of forming glass wool in the form of the core material 210, glass wool yarns having an average diameter of 3~7 μm may be used.

In the present invention, since a binder or a thermal compression process is not used, glass wool yarns having an average diameter of less than 3 μm make it difficult to maintain a desired shape, and glass wool yarns having an average diameter of greater than 7 μm make it difficult to perform normal press compression and cause deterioration in properties as the core material.

Further, for a flat board type core material, press compression is performed at a reduction rate of 50~80%.

If the reduction rate of the core material is less than 50%, the core material becomes excessively thick, thereby causing the aforementioned problems related to the drying equipment and handling difficulty. On the contrary, if the reduction rate of the core material exceeds 80%, the core material becomes excessively thin, thereby causing deterioration in performance of the vacuum insulation material.

In addition, the core material may be prepared in the form of a flat board having a variety of planar shapes, or in the form of a groove type board including groove-shaped nodes for bending.

Next, the inner bag may be formed of at least one selected from PP non-woven fabrics (18 g/m$^2$) having a thermal conductivity of 2.904 mW/mK, PP non-woven fabrics (30 g/m$^2$) having a thermal conductivity of 2.684 mW/mK, PP non-woven fabrics (40 g/m$^2$) having a thermal conductivity of 2.841 mW/mK, PET non-woven fabrics (18 g/m$^2$) having a thermal conductivity of 3.143 mW/mK, PET non-woven fabrics (25 g/m$^2$) having a thermal conductivity of 3.312 mW/mK, PET non-woven fabrics (40 g/m$^2$) having a thermal conductivity of 4.120 mW/mK, and a PE air-permeable film (40 g/m$^2$) having a thermal conductivity of 3.171 mW/mK. Here, the thermal conductivity is not a fixed value and can be obtained, for example, by cutting the vacuum insulation material into a 10×200×200 mm (thickness×width×length) specimen, and measuring the thermal conductivity of the specimen using a tester HC-074-200 obtained from Eko Co., Ltd. Thus, the thermal conductivity can be changed according to the size of the sample and the laminate structure of the inner bag.

When the vacuum insulation material according to the present invention is manufactured based on these data, it can be seen that the vacuum insulation material exhibits lower (better) thermal conductivity with increasing air permeability of the air-permeable film.

In addition, the cover material may have a vacuum degree of 0.1 Pa to 10 Pa. If the vacuum degree of the cover material is less than 0.1 Pa, there can be a problem of deterioration in production efficiency, and if the vacuum degree exceeds 10 Pa, there can be a problem of deterioration in initial heat capabilities and long-term durability.

All of the vacuum insulation materials manufactured in these ways exhibited excellent long-term durability, and examples of these vacuum insulation materials will now be described.

Example 1

First, an inner bag was formed using a glass wool type core material as described in FIGS. 2 and 3 and 18 g/m$^2$ of PP non-woven fabrics.

Here, a single getter prepared by packing 20 g of quicklime (CaO) having a purity of 95% in a pouch was inserted into the core material, as shown in FIG. 2.

Then, a vacuum cover material was formed by stacking a 12.5 μm thick polyvinylidene chloride (PVDC)/polyethylene terephthalate (PET) film, a 25 μm thick Nylon film, a 6 μm thick Al foil and a 50 μm thick linear low density polyethylene (LLDPE) film.

Next, with the core material inserted into the cover material, the cover material was sealed to a vacuum of 4 Pa, thereby preparing a vacuum insulation material according to the present invention.

Then, the vacuum insulation material was cut into a 10×600×600 mm (thickness×width×length) specimen, which was used to measure the thermal conductivity of the vacuum insulation material using a tester HC-074-600 obtained from Eko Co., Ltd. Results are shown in Table 1.

Example 2

A vacuum insulation material was prepared in the same manner as in Example 1 except that the inner bag was formed using 18 g/m$^2$ of PET non-woven fabrics.

Example 3

A vacuum insulation material was prepared in the same manner as in Example 1 except that the inner bag was formed using 40 g/m$^2$ of a PE air-permeable film.

Comparative Example 1

A vacuum insulation material was prepared in the same manner as in Example 1 except that the inner bag was formed using a non-air-permeable polyethylene film.

Comparative Example 2

A core material having a size of 10×600×600 mm (thickness×width×length) was prepared from glass wool through a wet process using an inorganic binder and used for manufacture of a vacuum insulation material.

Then, the vacuum insulation material was prepared in the same manner with regard to the cover material, the getter, and the sealing method as in Example 1 except that the inner bag was not used.

TABLE 1

|  | Example 1 | Example 2 | Example 3 | Comparative Example 1 | Comparative Example 2 |
|---|---|---|---|---|---|
| Thermal conductivity (mW/mK) | 1.868 | 1.889 | 1.924 | 2.021 | 2.101 |

From Table 1, it can be seen that the vacuum insulation materials according to the inventive examples have a thermal conductivity of 2.0 mW/mK or less.

Here, the vacuum insulation materials prepared in the comparative examples had similar thermal conductivity values to those of the vacuum insulation materials prepared in the inventive examples. However, in Comparative Example 1, the inner bag was formed using the non-air permeable film, and an unnecessary process and cost for tearing some of the inner bag was added.

Further, in Comparative Example 2, the inorganic binder was used without forming the inner bag, making it difficult to reuse of glass wool and deteriorating process efficiency.

Although some embodiments have been described herein, it will be understood by those skilled in the art that these embodiments are provided for illustration only, and various modifications, changes, alterations and equivalent embodiments can be made without departing from the scope of the present invention. Therefore, the scope and sprit of the present invention should be defined only by the accompanying claims and equivalents thereof.

The invention claimed is:

1. A vacuum insulation material comprising:
an inner bag made of an air-permeable film and compressing and packing a surface of a core material;
a cover material disposed on the inner bag through vacuum packing; and
a getter inserted between the inner bag and the cover material,
wherein the core material includes a glass wool,
wherein the inner bag is an air-permeable film formed of at least one of polypropylene (PP), polyester (PET) and polyethylene (PE), and comprising fine holes,
wherein the fine holes having a diameter of 0.1~10 μm, and the fine holes of the air-permeable film occupy 30~90% of an overall surface area of the air-permeable film.

2. The vacuum insulation material according to claim 1, wherein the core material has a thickness of 20~40 mm.

3. The vacuum insulation material according to claim 2, wherein the core material has a thermal conductivity of 2.0 mW/mK or less.

4. The vacuum insulation material according to claim 1, wherein the cover material has a laminate structure formed by stacking a surface protective layer, a metal barrier layer and an adhesive layer.

5. The vacuum insulation material according to claim 4, wherein the metal barrier layer comprises an Al foil.

6. The vacuum insulation material according to claim 1, wherein the getter comprises quicklime (CaO) powder having a purity of 95% or more.

* * * * *